United States Patent [19]

Deni

[11] Patent Number: 5,048,269

[45] Date of Patent: Sep. 17, 1991

[54] VACUUM SEALER

[76] Inventor: Frank Deni, 130 Deer Run, Williamsville, N.Y. 14221

[21] Appl. No.: 520,729

[22] Filed: May 9, 1990

[51] Int. Cl.⁵ ............................................. B65B 31/04
[52] U.S. Cl. .................... 53/512; 53/374.9; 53/390
[58] Field of Search ............... 53/373, 390, 432, 433, 53/434, 405, 510, 511, 512, 374.8, 374.9; 417/405

[56] References Cited

U.S. PATENT DOCUMENTS

| | | | |
|---|---|---|---|
| 2,749,686 | 6/1956 | Lorenz et al. | 53/434 |
| 3,234,072 | 2/1966 | Dreeben | 53/373 X |
| 3,458,966 | 8/1969 | Dunbar et al. | 53/434 X |
| 3,969,039 | 7/1976 | Shoulders | 417/405 X |
| 4,115,182 | 9/1978 | Wildmoser | 53/373 X |
| 4,251,976 | 2/1981 | Zanni | 53/434 X |
| 4,330,975 | 5/1982 | Kakiuchi | 53/512 X |
| 4,561,925 | 12/1985 | Skerjanec et al. | 53/405 X |
| 4,598,531 | 7/1986 | Ruff et al. | 53/390 X |
| 4,860,523 | 8/1989 | Teteishi et al. | 53/390 X |
| 4,941,310 | 7/1990 | Kristen | 53/434 X |

FOREIGN PATENT DOCUMENTS

| | | | |
|---|---|---|---|
| 2841017 | 4/1979 | Fed. Rep. of Germany | 53/373 |
| 3203951 | 8/1983 | Fed. Rep. of Germany | 53/512 |

Primary Examiner—John Sipos
Attorney, Agent, or Firm—James J. Ralabate

[57] ABSTRACT

The novel vacuum sealer of this invention has three wires that are heated to varying degrees. Two wires are used or dedicated to sealing a plastic bag and one of the wires is used to cut the bag after the vacuum sealing step. The vacuum sealer is tapered downwardly, i.e. has a low profile, for a better air flow during the vacuuming step. A turbine with curved fins is used to increase the air flow and reduce the time to evacuate air from the bag. Also, the low profile of the unit, the increased size air ducts and the curved fins on the turbine, provide a more effective system for evacuating air from the plastic bag to be used.

6 Claims, 3 Drawing Sheets

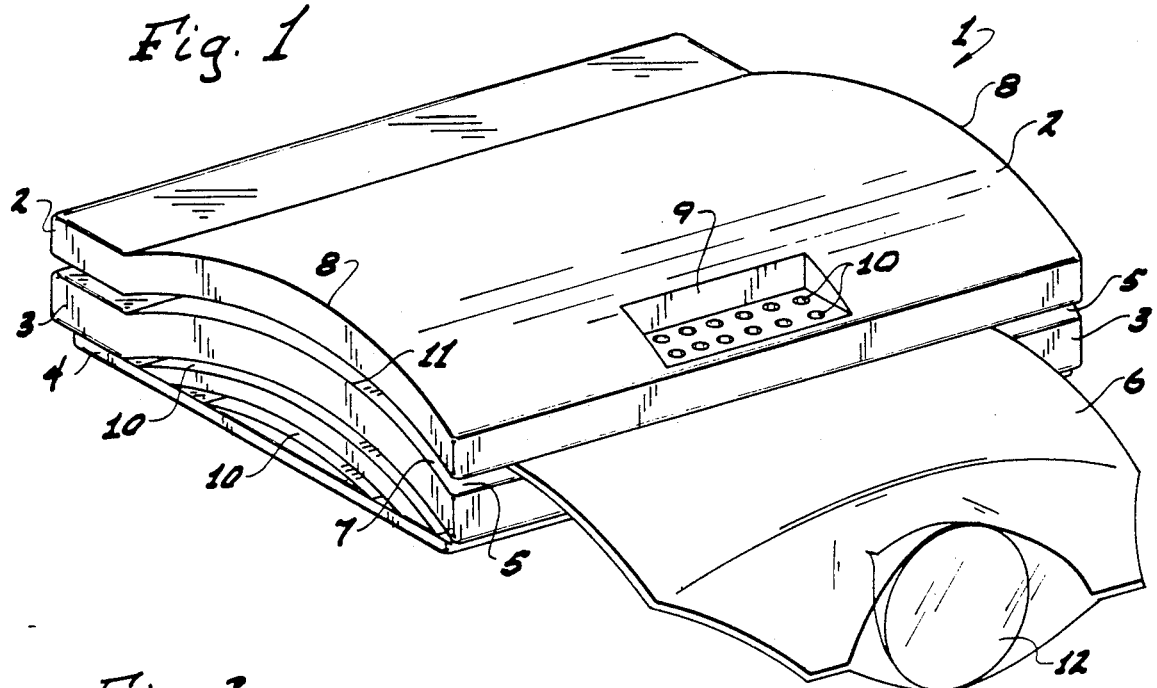
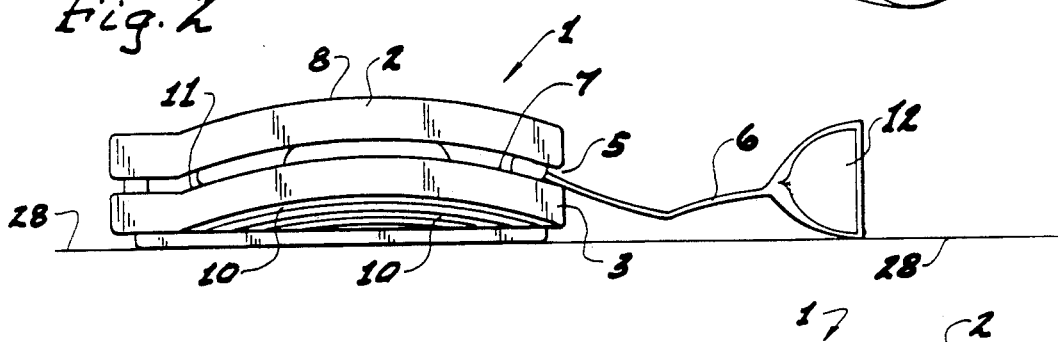
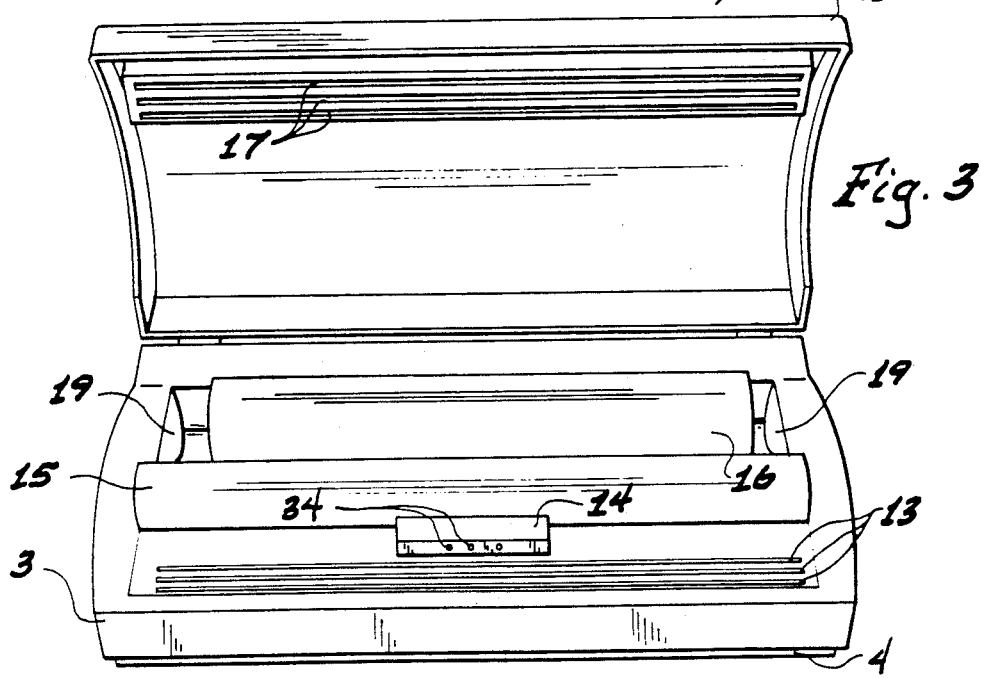

VACUUM SEALER

This invention relates to a vacuum sealer and, more specifically, to a novel vacuum sealer for both home and light commercial use.

BACKGROUND OF THE INVENTION

There are known in the art various embodiments of vacuum sealers for both home and light commercial usage. These sealers are used generally to seal high-density polyethylene, styrene base plastics or other type plastic bags that contain various foods. After sealing the bags containing the food, the food can be frozen or otherwise preserved for later consumption. Fruits, vegetables, meats, sandwiches and even liquid foods such as soups can be stored in sealed plastic bags. A properly sealed bag preserves the flavor, freshness, color and nutrients of the food contained therein. Items other than food can be kept in these sealed bags such as papers to be kept watertight, matches, flower seeds, articles to be kept moth-free in the summer months, shampoos or soaps with proper portions, travel items to be kept secure and to avoid spillage and also photos or other documents to be preserved. Food can be frozen in these bags and protected against freezer burn or can be used in microwave cooking and in-bag cooking.

Many of the prior art sealers such as Applicant's Deni FRESHLOCK (Deni and Freshlock are registered trademarks of Keystone Manufacturing Co. of Buffalo, New York) have been successfully used in the household for a variety of purposes. The Deni FRESHLOCK is described, for example, in "The Gourmet Retailer", April 1990, volume II, Number 4 on page 61. While this type of sealer has many advantages, certain aspects can be substantially improved upon. Not only the Deni FRESHLOCK sealer but also most other home-use sealers use one or two heated wires to both seal and cut the plastic bag. It has been found that these one or two wire sealers do not consistently provide the strongest seal on the bag. This is because a one-wire or two-wire unit requires a dual function for the wire or wires and cannot assign a dedicated specific use for each. Other sealers provide a wire to seal and a cutter blade to cut or sever the bag. This involves including a relatively expensive cutting mechanism in each sealer and an additional step by the user and also including just one more component that can break down or require repair. A home vacuum sealer having improved sealing characteristics and avoiding costly cutting mechanisms would be a substantial improvement in the art.

The sealing units used previously generally utilize a fan to provide the vacuum effect in the unit. The fans used generally have straight fins or blades which do not provide the most efficient vacuum or air movement. Sealers having improved vacuum generating effect would also provide a substantial improvement in the home use vacuum sealers.

One serious problem confronting any sealer of this type is the air flow pattern from the fan through the air nozzle and into the plastic bag. This air flow problem is generally caused by a plurality of reasons. One reason is the height of the unit above the table or work surface. If the sealer is too high the bag will have a substantial drop as it is suspended from the sealer and form an S-like configuration which could impede the flow of air or vacuum effect. Another potential air flow problem could be caused by the lead-in structure for the bag in the interior of the sealer. The less severe the curvature of the bag both inside and outside the vacuum sealer, the less resistance there will be to air flow and subsequent vacuum action. Another potential problem could be caused by insufficient or inefficient air exhaust vents which expel the air from the sealer during the vacuum process. Most air outlets in the prior art vacuum sealers are small and are located in the bottom of the unit which could increase the resistance to air exhausting. It would be desirable to make a unit having a lower profile, better and more efficient exhaust vents, increased vacuuming effect and better balance than those sealers previously available.

SUMMARY OF THE INVENTION

It is therefore an object of this invention to provide a novel vacuum sealer devoid of the above-noted disadvantages.

Another object of this invention is to provide a home vacuum sealer that has substantially improved air flow and vacuum action.

Still a further object of this invention is to provide a vacuum sealer that has a lower profile, better air exhaust means and more stability when used.

Yet a further object of this invention is to provide a vacuum sealer that utilizes an improved turbine fan for better vacuum generation.

Still another object of this invention is to provide a vacuum sealer that substantially improves the seal imparted upon the plastic bag.

Yet another object of this invention is to provide a novel vacuum sealer that is wider, shorter and therefore more convenient and stable to use.

Yet still another object of this invention is to provide a novel vacuum sealer unit that is wider, quieter, shorter, more efficient and allows a better air flow from sealer to bag.

Still yet another object of this invention is to provide a novel vacuum sealer that has an improved and more efficient air intake nozzle for insertion into the bag.

These and other objects are accomplished by providing a novel vacuum sealer having a low profile which facilitates better air flow from sealer to bag. In a three-wire unit embodiment of this invention, the center wire has a dedicated cutting function while the two outside wires have dedicated sealing functions. The sealing wire closest to the bag roll seals the plastic roll to form a subsequent bag for use. The sealing wire farthest from the plastic roll seals the immediate bag. Also by the present invention, the use of expensive cutting mechanisms in avoided. While more than three heated wires may be used if desired, it has been found that three wires provide the most efficient cost considered embodiment. A turbine fan having curved fins is used in the present invention to improve the vacuuming effect of the unit. It has been considered that the vacuuming effect is enhanced at least 50% by the use of curved fins rather than the prior art straight fins. The turbine fan of this invention is powered by any suitable power source or motor such as those manufactured by the Johnson Co. of Hong Kong.

A rounded plastic bag guide is located in the interior section of the housing of the vacuum sealer to provide a less severe bag distortion thus a better air flow from the sealer to the bag. Any distortion or bend in the bag could cause air flow difficulties. To improve the air exhaust capabilities of the present sealer unit, exhaust vents are located on the side or sides of the housing.

Again, this expedient vastly improves the vacuum action by allowing faster escape of discharged air from the bag and sealer unit thus reducing the time required to evacuate air from the bag.

A ribbed nozzle is provided as the air conduit between the bag and sealer. Because of the ribs in the nozzle face, better air intake is accomplished. When using the novel vacuum sealer of this invention the user pulls the bag roll toward the sealing wires. The open end of the bag is used to insert the food or other object into the bag. After filling the bag and making sure that the sealing area of the bag is free from liquid or food particles, the open end of the bag is placed over the sealing wire as if preparing to seal the bag. The central air extractor nozzle is positioned inside the bag opening. The cover or lid of the housing is gently depressed and held in this position. The air extractor motor and turbine fan will start and a vacuum indicator will light up as the air is automatically extracted from the bag. When the vacuum effect or air is extracted from the bag to the extent desired, the lid is pressed down more fully. The bag is now sealed and the cutting wire will facilitate tearing the bag free from the sealer unit.

Any power source such as electricity may be used to power the vacuum sealer of this invention. A battery power source may be used if suitable. The unit housing can be made from any suitable heat-resistant material such as polycarbonates, polyurethanes, polyacrylates, polyvinylchloride, polystyrene, polyesters, fiberglass or any other material, if suitable. The heating wires are generally a high heat and electrical conducting material such as nickel-chromium wires. The lid and bottom housing should have an elastomeric cushion pad which surrounds the peripheral portions for better pressing and resilient action during the vacuum operation. The plastic bags used generally come in available polyethylene folded rolls or other appropriate plastic rolls. Any suitable plastic bag may be used such as those polyethylene bags manufactured by Taiwan Fairmost International Corp. of Taiwan. At the front inner portion of the housing lid is a silicon rubber bar which mates with the three wires located in the corresponding inner portion of the lower housing. This rubber bar can be made from any suitable material provided that it has an operating temperature range of from $-73°$ C. to $232°$ C. An appropriate material for this rubber bar is Silastic NPC40 and NPC80 made by Dow Corning. The principal function of this rubber bar is to press the plastic bag material against the sealing wires as they heat up.

BRIEF DESCRIPTION OF THE DRAWINGS

FIG. 1 is a top perspective closed view of the vacuum sealer of this invention during the vacuum-sealing operation.

FIG. 2 is a side plan closed view of the vacuum sealer of this invention during the vacuum-sealing operation.

FIG. 3 is a top-front perspective open view of the vacuum sealer of this invention in preparation for the sealing operation.

DESCRIPTION OF THE DRAWING AND PREFERRED EMBODIMENTS

Figure 4:
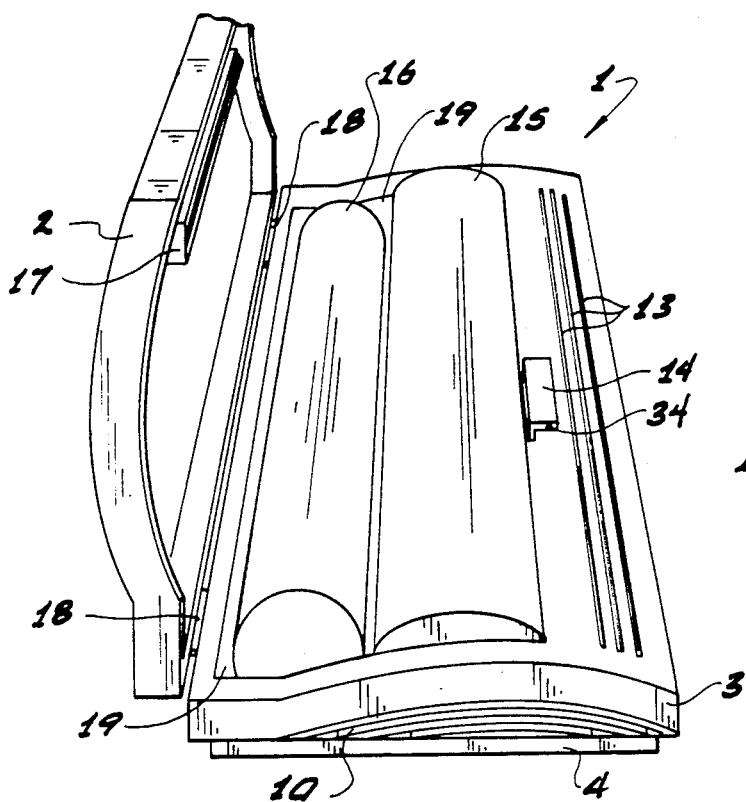
FIG. 4 is a top-side perspective open view of the vacuum sealer of this invention in preparation for the sealing operation.

In FIG. 1 the vacuum sealer 1 comprises a two-part housing, a lid 2 and a bottom housing 3. The bottom housing 3 has a bottom panel 4 that is removable (as shown in FIG. 5) to permit access to the interior of vacuum sealer 1. The sealer 1 has a low height or profile, substantially lower than the prior art units. By "low profile" or "low height" is meant the bag exit opening 5 is from about 1.0 to 1.5 inches from the ground or support surface whereas prior art units have a bag exit of from about 2.5 to 4.0 inches. This low profile greatly improves the air flow from the sealer 1 to the interior of the bag 6 and prevents the top of the bag from sliding out of the sealer. There is a much straighter air flow path because of the low profile and tapered end 7 of the unit 1. If suitable, around the opening 5 around the peripheries of lid 2 and portion 3 can be a resilient liner or padding to protect the lid 2 and portion 3 against damage during the pressing operation. The curved outer surface 8 of lid 2 provides a convenient hand curvature to provide easy pressing down of lid 2 during the vacuuming process. A handle cutout 9 is provided for easy gripping of the lid 2. Air exhaust ducts or outlets 10 are located on the side or preferably both sides of unit 1. Vents 10, however, can be located on any or all four sides of unit 1 and can be positioned in the side or sides of bottom housing 3, of panel 4 or of lid 2. These ducts 10 extend from the interior of the bottom portion 3 to the atmosphere. These ducts 10 allow a freer escape means for air from the interior of bottom portion 3. This is important because this reduces air resistance as it is exhausted from the bag and eventually into the atmosphere. The curvature 8 of the lid and complementary curvature portion 11 of the bottom portion 3 provide a smooth path guide for the bag and permit much easier flow of air therefrom during the vacuum operation. The bag 6 extends from a roll of folded web of bags inside unit 1 to the outside where an object 12 can be placed into it before sealing and the opposite side of the bag that is shown still in between lid 2 and bottom portion 3 at opening 5 is sealed. The bag 6 is sealed at both ends by merely placing the bag end to be sealed over the sealing wires (shown in FIGS. 3 and 4) and depressing the lid 2 gently down until the vacuum indicator light goes on. The air at this point will be drawn out of bag 6 as the spinning turbine in the interior causes a vacuum air flow effect through an air nozzle that is in air flow connection with the turbine and an air extraction nozzle, both to be later described. The vacuum effect operates on the same principle as a vacuum cleaner.

In FIG. 2 a side view of unit 1 is shown as bag 6 extends out from unit opening 5. The curvatures or curved portions 8 and 11 of lid 2 and bottom housing 3, respectively, can be clearly seen. The smooth and relatively obstruction-free path of bag 6 can be seen because of these curvatures and the low profile of the unit 1 and opening 5. A bottom removable panel 4 is illustrated; this panel 4 can be removably attached to bottom housing 3 by any convenient means such as screws, bolts or other removable attachment means. Air ducts or vents 10 are shown on the side where they can facilitate easy exhausting of air from the interior of bottom housing 3. The relatively low height or low profile of unit 1 can be clearly seen in FIG. 2. The air ducts 10, the tapered or low profile of unit 1 and the curved fins 21 (later described) provide a more effective air evacuation of bag 6. Also, the time required to evacuate the air from bag 6 is accordingly reduced substantially.

In FIG. 3 the lid 2 is lifted to open unit 1 showing the three heated wires 13 located at the entrance to unit 1 at or near opening 5. Located behind wires 13 at a position approximately at the midpoint of opening 5 is an air extractor nozzle 14 which is used to extract the air from the interior of bag 6 during the vacuuming cycle or process. The nozzle 14 is inserted into the open end of bag 6 and the lid 2 closed and gently pressed down holding the open end of bag 6 with nozzle 14 inserted therein. By closing lid 2 a switch or starting mechanism is triggered off which causes a turbine to rotate and draw air out of the bag 6 via nozzle 14. Nozzle 14 is ribbed which allows air to be extracted easier from the bag because it permits air to enter from both sides and front and uses ribs to create air channels toward the rear of the bag. The triple wire configuration 13 facilitates a double seal one in the next subsequent bag on the roll 16 and one in the bag 6 to be presently used. This one operation performs a dual seal and prepares the next bag by the upper sealing wire 13 sealing one side of the next bag. The lower sealing wire 13 seals the side of the bag 6 to be used and to be later filled through an unsealed open end with object 12 and sealed in a second operation. This dual or double seal can only be accomplished since the sealer of this invention provides two dedicated sealing wires and one dedicated cutting wire. By providing a dual seal function, one in the present bag 6 and one in the next subsequent bag on the roll 16 a much stronger and more airtight seal is provided because each wire 13 has a specific dedicated function as noted earlier. Behind nozzle 14 is located a curved bag guide 15 over which bag 6 extends from bag roll 16. The roundness of bag guide 15 avoids obstructions to air flow and also avoids damage to the bag because of a smooth and curved surface. The bag supply extends from a bag roll 16 located adjacent but behind curved bag guide 15. It is critical to this invention, and for optimum results, that curved bag guide 15 be positioned in unit 1 at a point between nozzle 14 and bag roll 16 or a bag roll dispenser means. At the inner front portion of lid 2 is a silicon rubber bar 17 that mates with the three wires 13 when the lid 2 is pressed down during the vacuuming operation. This rubber bar 17 is important because it presses the bag material into the sealing wires and fuses the bag layers together.

Figure 5:
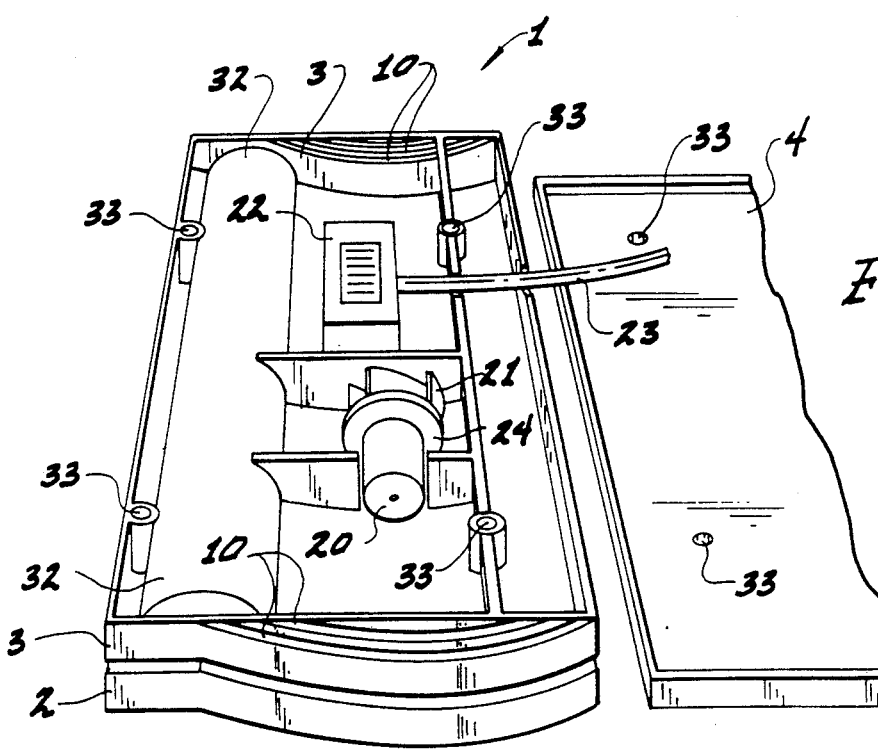
FIG. 5 is a bottom perspective view of the bottom interior portion of the sealer of this invention with the bottom housing panel removed.

In FIG. 4 the same open view as in FIG. 3 is shown except in a side perspective. Lid 2 is shown fully opened upon hinge means 18 which may be any suitable hinge means. A bag roll cavity or depression 19 is provided for housing a roll 16 or supply of bags. This cavity 19 is formed immediately behind curved or rounded bag guide 15. Bag roll or supply housing or compartment 19 is tubular in order to accommodate a roll of plastic bags. The bag supply then extends over bag guide 15 for a smooth path unobstructed by any sharp corners or edges. The bag supply can be cut off after sealing the leading side of the web while leaving an end of the bag open. An object of food or other item or items are then placed into the opened end of bag 6 and this open end then placed over wires 13 with nozzle 14 extending into the bag 6 from its opened end. Once in position lid 2 is closed activating the sealing-vacuuming process where nozzle 14 draws air out of bag 6 because of the vacuum action initiated by closing lid 2. Since there is less vibration in unit 1 than in prior art units, it is much quieter when in operation.

In FIG. 5 unit 1 is turned over so that removable panel 4 is facing upward. Screws are removed which previously had connected panel 4 to bottom housing 3. Once panel 4 has been removed the interior of housing 3 is exposed. Located directly under the hollow formed by bag guide 15 is a housing for the turbine fan 24 and its motor 20. The motor 20 can be any suitable power source such as a 110v-120v AC motor. As turbine 24 rotates, its curved fins 21 suck air into the unit 1 and out of a bag 6 via air extraction nozzle 14. The curved fins 21 of this invention are critical because without them a greatly reduced vacuum effect would be created. An air conduit (not shown in drawings) extends from a point adjacent said turbine 24 to said air extraction nozzle 14 so that there is a free and unobstructed air path between turbine 24 and nozzle 14. Located also in the hollow of under bag guide 15 is transformer 22 which provides the energy to heat wires 13 upon demand as well as to the remainder of the circuit. Heating means 22 suitable for use are typically a transformer and circuitboard with electronics such as that manufactured by Dyco Electronics of Hornell, N.Y. A wire 23 to be connected to a source of electrical energy can be connected to any suitable portion of unit 1 as desired. The hump 24 formed by the hollow or cavity 19 houses the roll of bags 16. All appropriate wire connections are made by wires or other suitable circuitry commonly used in devices of this type.

Figure 6A:
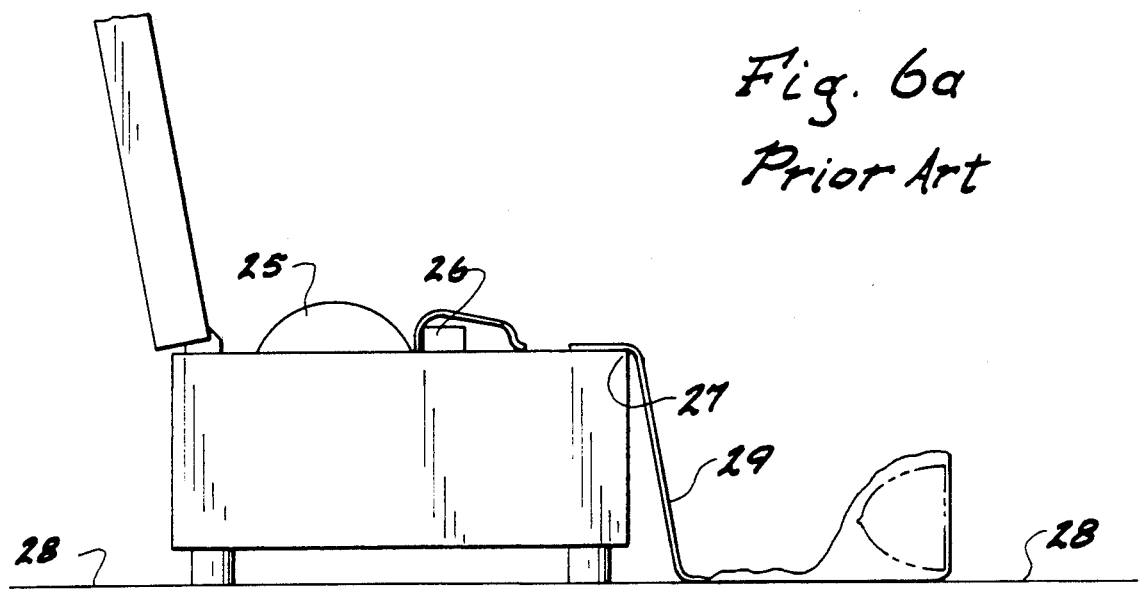
FIG. 6 shows in 6A the prior art sealers in a side plan view and 6B shows the present sealer in a side plan view.
Figure 6B:
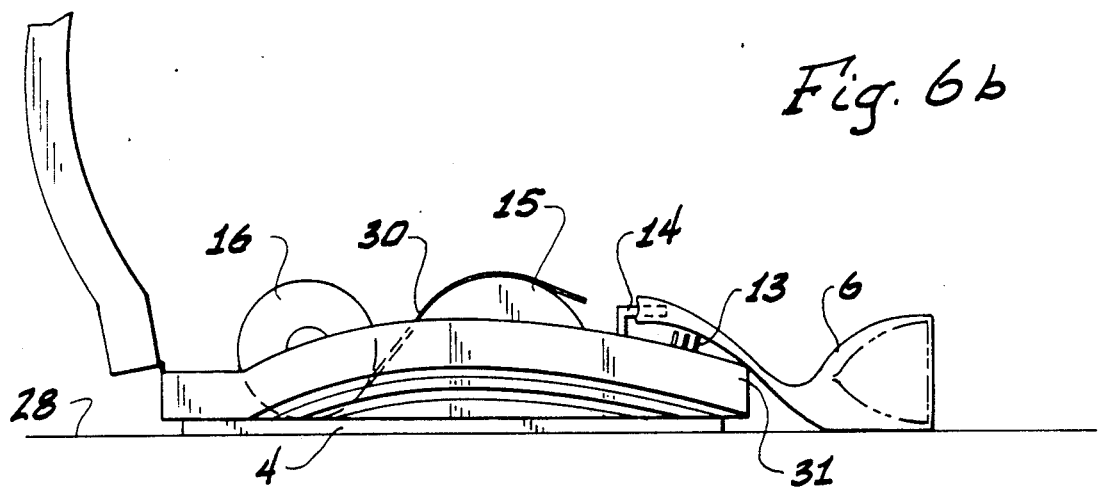

In FIG. 6 a comparison between the present invention air flow path (FIG. 6B) and the air flow path of prior art devices is illustrated. In FIG. 6A a prior art vacuum sealer is shown in side breakaway view. The bag roll 25 extends over a sharp guide 26 then over a relatively high corner 27 down for a considerable distance to a supporting surface or the ground 28. The several severe bends in the plastic bag source 29 is very evident. The air flow path in these prior art units is not straight and unencumbered as in the path of bag shown in FIG. 6B of the present invention. In FIG. 6B the bag 6 is shown with relatively little obstruction to a smooth air flow path while in 6A prior art devices do not provide this significant advantage. Because of the lower profile and tapered end 31 a much clearer air path is provided by the present invention. In FIG. 6B air extraction nozzle 14 is shown inserted into the open end of bag 6. When the lid 2 is closed thereon (as shown in FIG. 2) nozzle 14 draws all the air out of bag 6 and wires 13 seal and cut the bag after air has been evacuated therefrom. The air passages 34 are shown both in the front and sides of nozzle 14 for more complete air evacuation. There is an air passageway extending from air passages 34 through to turbine 24 which sucks (by rotation) the air out of bags 6 and out air vents 10. Because of larger air passages 34 and larger air vents 10, a much more efficient evacuation of air from bags 6 is accomplished than was possible in prior art devices. These passages 34 and air vents 10 are critical to the present invention.

Figure 7:
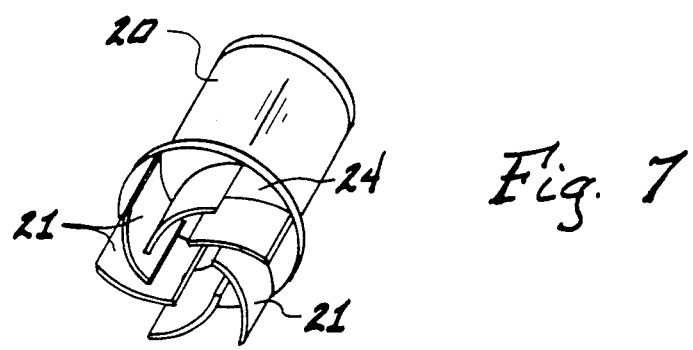
FIG. 7 is a top perspective view of the novel sealer turbine fan used in the sealer of this invention.

In FIG. 7 turbine 24 and motor 20 are shown in an enlarged view. Turbine 24 and its specific construction are critical to the optimum operation of the unit 1 of this invention. Turbine 24 has curved vanes or fins 21 which generate a much greater air flow than straight fins and could enhance the vacuuming effect of this invention over 50% of prior art units. Also, the use of curved fins reduces the time required to evacuate air from the bag during the vacuum step. Any suitable number of fins 21 may be used depending upon the desired effect. It is preferred that at least four curved fins 21 be used and optimumly six or more fins be used. Any suitable motor 20 may be used such as those manufactured by previously-mentioned Johnson Co. of Hong Kong.

The preferred and optimumly preferred embodiments of the present invention have been described herein and shown in the accompanying drawing to illustrate the underlying principles of the invention but it is to be understood that numerous modifications and ramifications may be made without departing from the spirit and scope of this invention.

What is claimed is:

1. A vacuum sealer comprising in combination a sealer housing, a bag supply compartment for supplying a folded web of bags, a vacuum-generating means and means for sealing and cutting the lead side of the folded web of plastic bags while leaving the end of the bag open, said sealer housing comprising at one first end of said housing a movable lid connected to a bottom housing portion and a sealer entrance located at a second opposite end of said housing, said lid and bottom housing portion when pressed together having activating means that initiates said vacuum-generating means and said means for sealing and cutting plastic bags, said means for sealing and cutting plastic bags all substantially immovably located along said sealer entrance, said means for sealing and cutting plastic bags comprising at lest three wires fixed in said bottom housing portion adjacent to and in substantially parallel positions to each other, at least two of said wires dedicated to forming an airtight seal on said bag, all of at least three wires fixed and located at said sealer entrance and between said at least three wires and said bag supply compartment is an air exhaust nozzle which comprises said vacuum-generating means for said open end of the bag for evacuating said bag after the sealing and cutting operation.

2. The sealer of claim 1 having a low profile to facilitate a continuous unobstructed air flow path from said vacuum-generating means to said bag.

3. The sealer of claim 1 wherein said vacuum-generating means comprises a rotatable turbine having at least four curved fins thereon, said turbine being in air flow connection with said air exhaust nozzle, said air exhaust nozzle having a projection for insertion into said bag.

4. The sealer of claim 1 wherein said bottom housing portion having air venting means on at least one of its side sections, said air venting means comprising openings from the interior of said bottom housing portion to the atmosphere.

5. The seal of claim 1 wherein said means for sealing and cutting plastic bags comprises three substantially parallel conductive wires, two of said wires dedicated to forming an airtight seal on said bags and one of said wires dedicated to forming a tear line on said bag.

6. The sealer of claim 1 wherein said vacuum-generating means comprises said air exhaust nozzle in air flow connection with rotatable turbine, said air exhaust nozzle having a plurality of openings through which air can flow as it is exhausted from said bag, said turbine having means to suck air from said bag through said nozzle and around said turbine to be exhausted to the atmosphere.

* * * * *